United States Patent
Liu et al.

(10) Patent No.: US 10,634,805 B2
(45) Date of Patent: Apr. 28, 2020

(54) SYSTEM AND METHOD FOR PREDICTING FAULT SEAL FROM SEISMIC DATA

(71) Applicant: CHEVRON U.S.A. INC., San Ramon, CA (US)

(72) Inventors: Huafeng Liu, Houston, TX (US); Donald Arthur Medwedeff, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 314 days.

(21) Appl. No.: 15/606,067

(22) Filed: May 26, 2017

(65) Prior Publication Data

US 2018/0341034 A1 Nov. 29, 2018

(51) Int. Cl.

| | |
|---|---|
| *G01V 1/30* | (2006.01) |
| *E21B 47/00* | (2012.01) |
| *E21B 47/06* | (2012.01) |
| *E21B 49/00* | (2006.01) |
| *E21B 49/08* | (2006.01) |
| *G01V 1/28* | (2006.01) |
| *G01V 1/36* | (2006.01) |

(52) U.S. Cl.
CPC .......... *G01V 1/306* (2013.01); *E21B 47/0002* (2013.01); *E21B 47/06* (2013.01); *E21B 49/00* (2013.01); *E21B 49/08* (2013.01); *G01V 1/282* (2013.01); *G01V 1/30* (2013.01); *G01V 1/364* (2013.01); *E21B 2049/085* (2013.01); *G01V 2210/57* (2013.01); *G01V 2210/642* (2013.01)

(58) Field of Classification Search
None
See application file for complete search history.

(56) References Cited

U.S. PATENT DOCUMENTS 4,679,174 A * 7/1987 Gelfand ................. G01V 1/282
367/38
5,835,452 A 11/1998 Mueller et al.
(Continued)

FOREIGN PATENT DOCUMENTS

WO 2017076966 A1 5/2017

OTHER PUBLICATIONS

Harris et al. "Robust wavelet estimation and quality measures", 2006, 4 pages. (Year: 2006).*

(Continued)

*Primary Examiner* — Suzanne Lo
(74) *Attorney, Agent, or Firm* — Marie L. Clapp

(57) ABSTRACT

A method is described for predicting fault seal based on a digital seismic image including defining a fault coordinate system locally parallel and perpendicular to the at least one fault surface; extracting seismic amplitudes from a sub-volume surrounding and containing the at least one fault surface and mapping the seismic amplitudes in the fault coordinate system; performing trace fitting of the seismic amplitudes along directions locally perpendicular to the fault surface to separate the fault seismic signal from other seismic energy; comparing the fault seismic signal derived from trace fitting to at least one of natural analogs and synthetic models of seismic response to generate a predicted fault seal; and identify geologic features based on the predicted fault seal. The method may be executed by a computer system.

12 Claims, 13 Drawing Sheets

(56) References Cited

U.S. PATENT DOCUMENTS

| | | | |
|---|---|---|---|
| 5,892,732 A * | 4/1999 | Gersztenkorn | G01V 1/32 367/59 |
| 6,791,900 B2 | 9/2004 | Gillard et al. | |
| 7,702,463 B2 * | 4/2010 | Levin | G01V 1/34 367/68 |
| 8,055,449 B2 | 11/2011 | Godfrey et al. | |
| 2014/0076543 A1 | 3/2014 | Ejofodomi et al. | |

OTHER PUBLICATIONS

Botter et al. "Seismic characterisation of fault damage in 3D using mechanical and seismic modelling" Marine and Petroleum Geology 77, 2016, pp. 973-990. (Year: 2016).*

Haney et al. "Fault-plane reflections as a diagnostic of pressure differences in reservoirs: A case study", Jan. 2003, 6 pages. (Year: 2003).*

Cerveny et al. "Reducing Uncertainty with Fault-Seal Analysis", Oilfield Review, Winter 2004/2005, pp. 38-51. (Year: 2005).*

Zhou et al. "Enhancing the resolution of seismic data using improved time-frequency spectral modeling", SEG Denver 2014 Annual Meeting, pp. 2656-2661. (Year: 2014).*

Skauvold, Jacob. "Parametric Wavelet Estimation" Norwegian University of Science and Technology, Thesis, Jul. 2014, 48 pages. (Year: 2014).*

Haney M, Sheiman J, Snieder R, Naruk S, and Busch J, Fault-plane reflections as a diagnostic of pressure differences in reservoirs: A case study, CWP-456, 2005.

Haney M, Snieder R, Ampuero J, and Hofmann R, Spectral element modelling of fault-plane reflection arising from fluid pressure distributions, Geophysical journal international, 2007.

Botter C, Cardozo N, Hardy S, Lecomte I, and Escalona A, From mechanical modeling to seismic imaging of faults: A synthetic workflow to study the impact of faults on seismic, Marine and Petroleum Geology, 2014.

Botter C, Cardozo N, Hardy S, Lecomte I, Paton G, and Escalona A, Seismic characterisation of fault damage in 3D using mechanical and seismic modelling, Marine and Petroleum Geology, 2016.

PCT International Search Report and Written Opinion, dated Aug. 22, 2018, issued in International Application No. PCT/IB2018/053277, filed on May 11, 2018, 13 pages.

Tetsuro Tsuru et al., "Variation of Physical Properties Beneath a Fault Observed by a Two-Ship Seismic Survey Off Southwest Japan", Journal of Geophysical Research, Feb. 3, 2005, 11 page(s), vol. 110, B05405, The American Geophysical Union.

Paul Hatchell, "Case History Fault Whispers: Transmission Distortions on Prestack Seismic Reflection Data", Geophysics, Mar.-Apr. 2000, pp. 377-389, vol. 65, No. 2, Society of Exploration Geophysicists.

PCT International Search Report and Written Opinion, dated Aug. 22, 2018, issued in International Application No. PCT/IB2018/053279, filed on May 11, 2018, 14 pages.

* cited by examiner

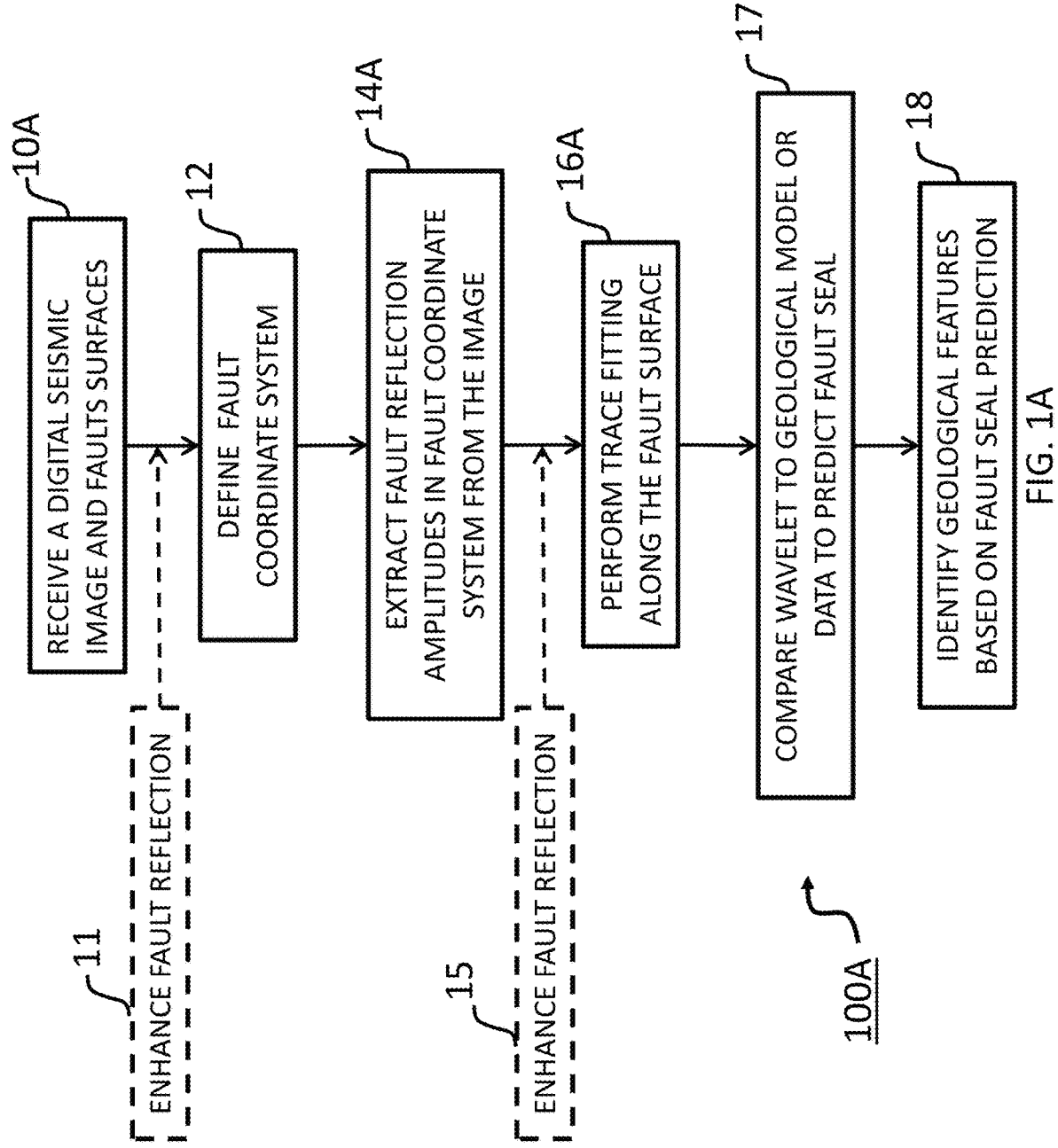

50 – Enhanced fault reflection in local-Cartesian coordinate system
52 – Trace fitting of the fault reflection

SYSTEM AND METHOD FOR PREDICTING FAULT SEAL FROM SEISMIC DATA

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for predicting whether subsurface faults are impermeable to fluids and, in particular, to a method of predicting fault seal from seismic data.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. In some cases, particularly in areas of complex geology, faults may cut through suspected hydrocarbon reservoirs. Depending on their geometry, lithologic juxtapositions, and stress states, faults can prohibit, impede, or enhance the movement of oil, gas, and water through hydrocarbon reservoirs. Accurate prediction of this behavior is important for the efficient and effective exploration and exploitation of oil and gas accumulations. Traditional fault characterization workflows are based on analysis of the juxtaposition of geologic sequences whose positions are interpreted from seismic reflection, well, and surface geologic data. Traditionally, faults are analyzed in 3D seismic images using a combination of visual inspection of lateral variations in horizon reflection character and multi-trace attributes. Both techniques identify and characterize faults based on differences in amplitude and/or phase of the adjacent horizon reflections. In these analyses, the quantitative character of the fault surface reflection (or lack thereof) is neither measured nor used in characterization of the fault's effect on fluid flow.

A few studies report using fault reflection signal for pore-pressure correlation (Haney et al. 2005, 2007). They describe use of slant stacks to enhance fault reflection signal, extract maximum amplitude within a window, map it onto fault surface, and qualitatively correlate the maximum amplitude with pressure difference across fault. This analysis lacks 1) capturing the full response of the fault surface and its surroundings and 2) the ability to quantitatively correlate reflection signal from the fault to other geological information. Botter et al. (2014, 2016) used discrete element and pre-stack depth migration modeling approach to understand seismic response of faults. This is an attempt to obtain insight of the fault from modeling and potentially tie modeled seismic to field observation. However, this approach does not provide quantitative information. The convolutional seismic modeling rather than realistic image modeling (with realistic complexity) simplifies overburden way too much. Additionally, the parameters used in the model may not be accurate because the forward modeling may or may not match field observations and multiple parameter combinations may produce similar outcomes.

The ability to define the location of rock and fluid property changes in the subsurface, including those across faults, is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for predicting fault seal in order to reduce risk in drilling into potential hydrocarbon reservoirs.

SUMMARY

In accordance with some embodiments, a method of receiving, at a computer processor, a digital seismic image representative of a subsurface volume of interest including at least one fault surface, defining a fault coordinate system locally parallel and perpendicular to fault, extracting seismic amplitudes from a sub-volume surrounding and containing at least one fault surface and mapping the seismic amplitudes in the fault coordinate system, performing trace fitting of seismic amplitudes along directions locally perpendicular to the fault surface to separate fault seismic signal from other seismic energy, predicting fault seal based on comparison of the fault seismic signal derived from trace fitting to natural analogs and/or synthetic models of seismic response, and identifying geologic features based on the predicted fault seal is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

FIG. 1A illustrates a flowchart of a method of predicting fault seal from a seismic image and a fault surface or surfaces, in accordance with some embodiments;

Like reference numerals refer to corresponding parts throughout the drawings.

DETAILED DESCRIPTION OF EMBODIMENTS

Figure 1B:
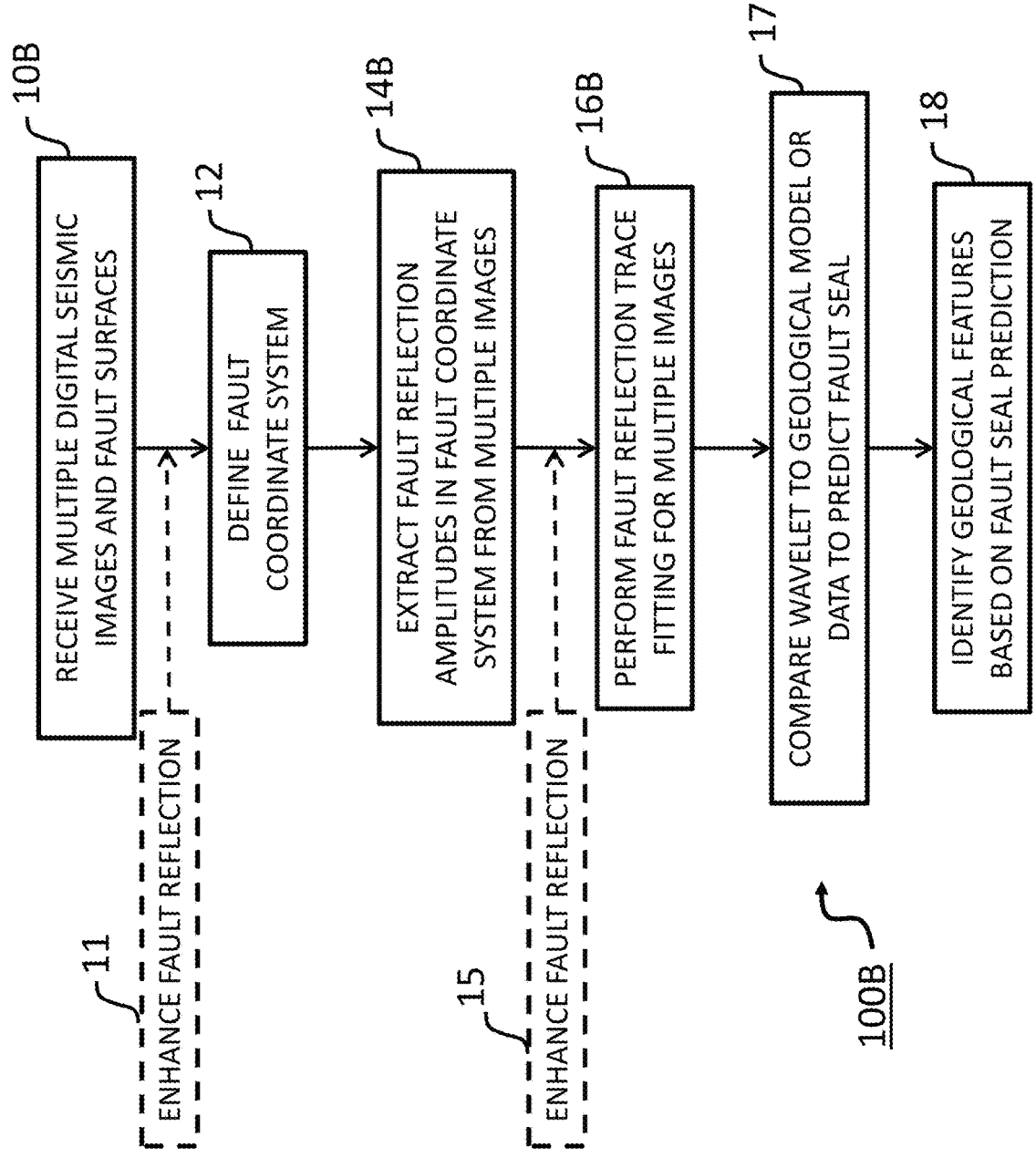
FIG. 1B illustrates a flowchart of a method of predicting fault seal from a set of seismic images made from a subset of the available pre-stack seismic data and a fault surface or surfaces, in accordance with some embodiments.

Described below are methods, systems, and computer readable storage media that provide a manner of predicting fault seal.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Definitions

Seismic signal—Any seismic response such as seismic amplitude, frequency, and/or phase that is generated by interaction of seismic energy with geologic features and is distinguishable from background variation.

Fault seismic signal—Any seismic signal that is generated by interaction of seismic energy generated by fault-rock or juxtaposition of lithologies and/or fluids across a fault.

Trace—An array of values representing samples of a property distributed at systematic intervals along a line in space.

Trace-fitting quality—The degree of similarity between two traces.

Trace fitting—A process in which traces are matched by systematically searching for the highest trace-fitting quality between a data trace and (a) a series of model traces with varying amplitude, phase, frequency, and/or a rigid-shift along the tract axis or (b) traces derived from analog-data, which is data from subsurface volumes believed to be analogous to the subsurface volume being analyzed.

Seismic imaging of the subsurface is used to identify potential hydrocarbon reservoirs. Seismic data is acquired at a surface (e.g. the earth's surface, ocean's surface, or at the ocean bottom) as seismic traces which collectively make up the seismic dataset. The seismic data is processed and used as input for a seismic imaging algorithm to generate a seismic image. The seismic image can be interpreted to identify potential hydrocarbon reservoirs. The seismic image may also include faults.

The present invention includes embodiments of a method and system for predicting fault seal from a seismic image. Predicting the fault seal allows a prediction on whether the fault may prohibit, impede, or enhance the movement of oil, gas, and water through the hydrocarbon reservoir.

FIG. 1A illustrates a flowchart of a method 100A for predicting fault seal in a complex subsurface volume of interest. At operation 10A, a digital seismic image including interpreted fault surfaces is received. As previously described, a seismic dataset includes a plurality of traces recorded at a plurality of seismic sensors. This dataset may have already been subjected to a number of seismic processing steps, such as deghosting, multiple removal, spectral shaping, and the like. These examples are not meant to be limiting. Those of skill in the art will appreciate that there are a number of useful seismic processing steps that may be applied to seismic data before it is deemed ready for imaging. The seismic image is generated by an imaging process such as migration (e.g. pre-stack depth migration, reverse time migration). These examples of imaging processes are not meant to be limiting; any seismic imaging process may be used. The seismic image may be 2-D (x and t or z) or 3-D (x, y, and t or z).

Referring to FIG. 1A, optionally, the digital seismic image with the fault surfaces may be subjected to an operation 11 to enhance the fault reflections. An example of this optional operation is shown in FIG. 2. In this example, the fault reflection has been enhanced by applying a f-k filter to mitigate energy interfering with the fault reflection signal. The original image slice (x, z) is in panel 20. After f-k filtering, the filtered fault reflection signal can be seen in panel 22. The difference between panel 20 and panel 22 is shown in panel 24. This optional step is one of the options to suppress energy from layer boundaries where the layer dips are significantly different (>20°) from that of fault surfaces.

Figure 3:
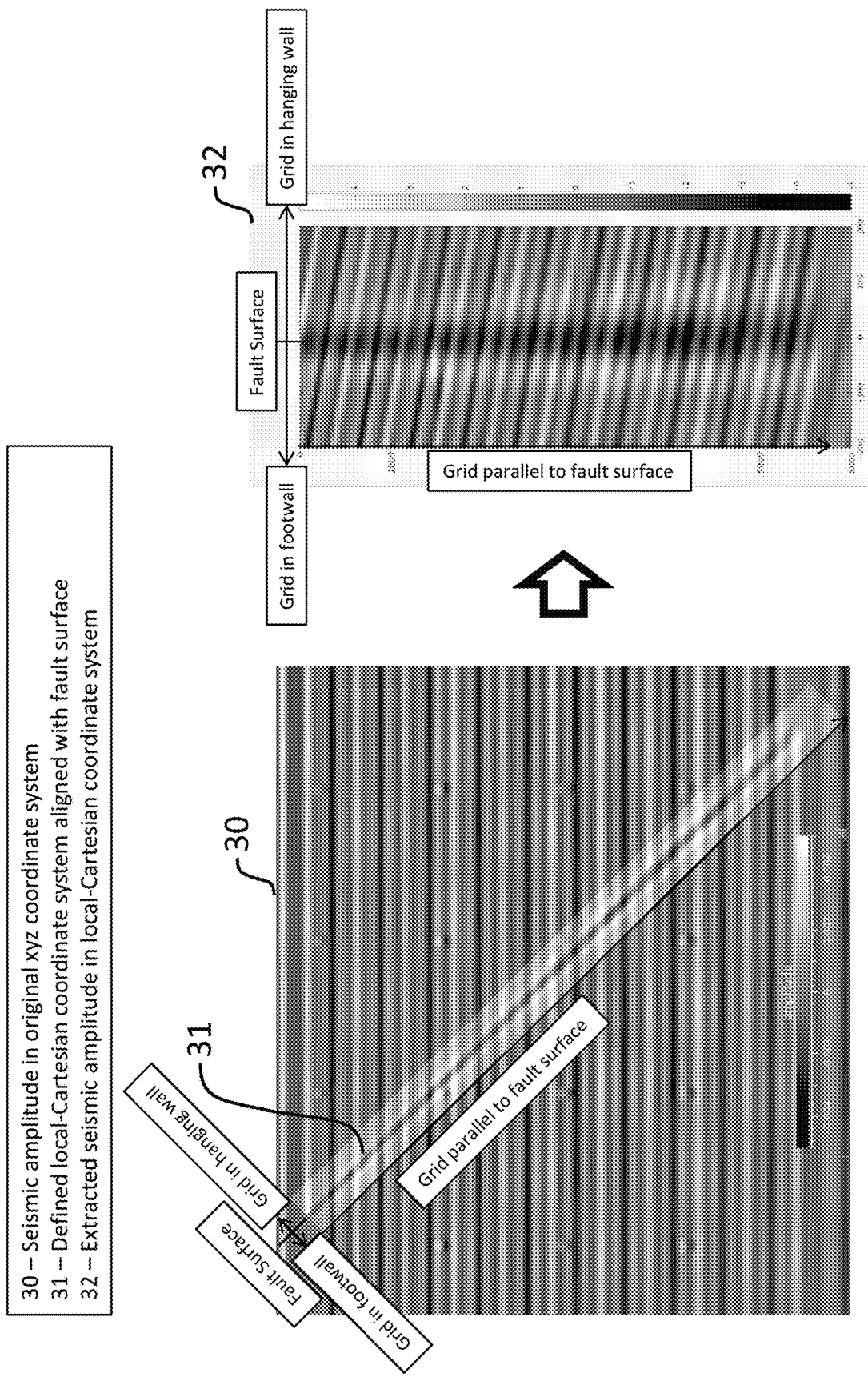
FIG. 3 demonstrates a step by which seismic amplitudes are extracted from a sub-volume surrounding and containing at least one fault surface, in accordance with some embodiments.

Referring again to FIG. 1A, at operation 12 a new coordinate system based on the fault orientation is defined. The fault surface defines one or two axis direction(s), dependent on whether the image is 2-D or 3-D, and the normal direction to the fault surface defines the other. The seismic amplitudes are extracted from the original seismic image and placed in the new coordinate system at operation 14. An example is shown in FIG. 3. In panel 30, the seismic section is in the original coordinate system (x, z). The fault surface 31 is highlighted. Panel 32 shows the extracted amplitudes in the fault coordinate system with a vertical fault surface in the middle.

Figure 4:
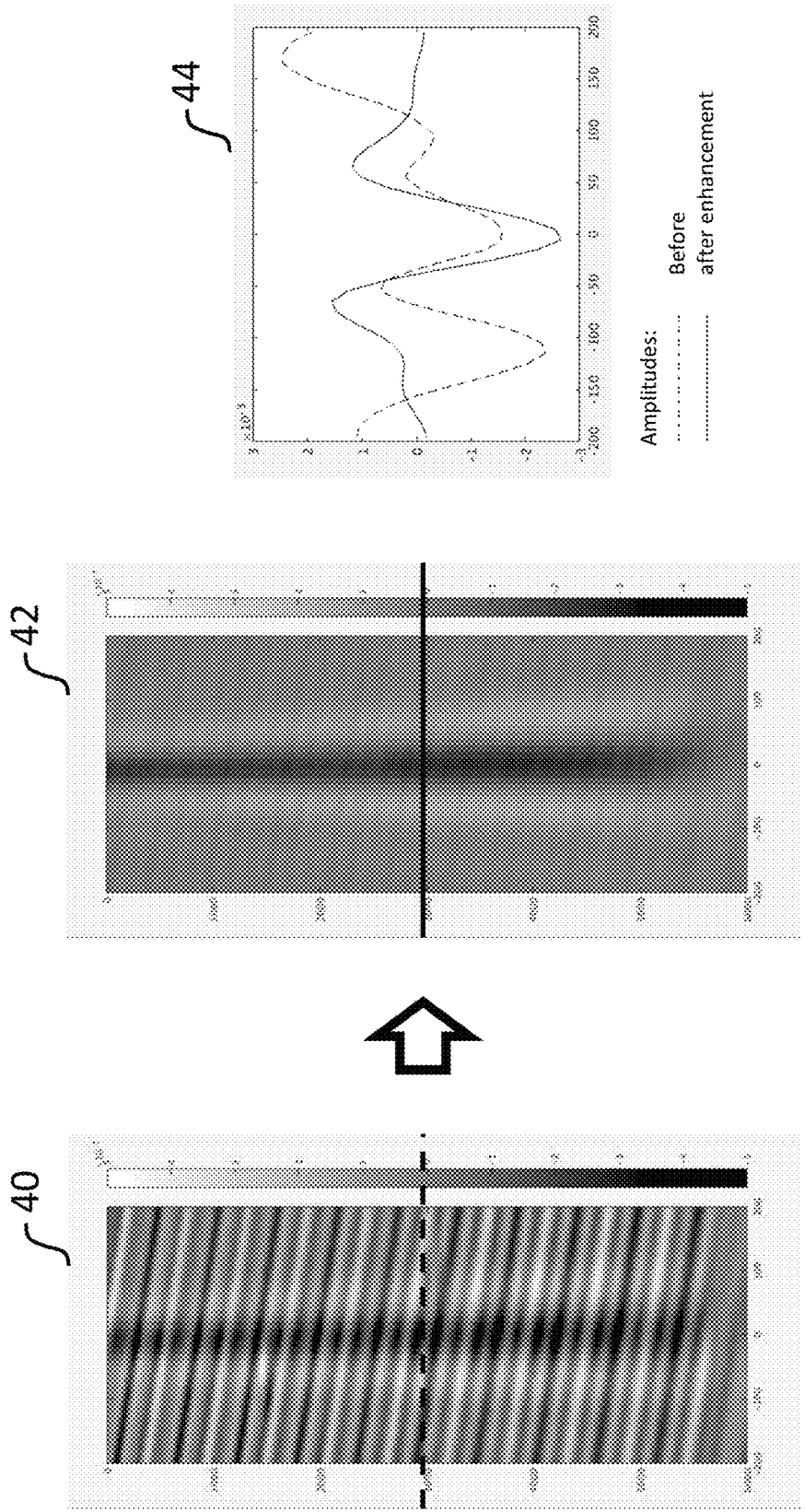
FIG. 4 demonstrates an optional step by which seismic amplitudes are stacked along fault parallel directions, in accordance with some embodiments.

Referring again to FIG. 1A, optionally, another fault reflection enhancement operation 15 may be performed. This may be, for example, a smoothing operation performed along the fault dip direction, as shown in FIG. 4. The extracted amplitudes in the fault coordinate system are in panel 40. After smoothing along the fault dip direction, the amplitudes in the fault coordinate system are shown in panel 42. The smoothing operation in the fault coordinate system has high similarity to a sliding-window-slant-stack operation in the original coordinate system but better matches the curvature of fault surface. A sliding-window-slant-stack may be a valid option for a given case.

Figure 5:
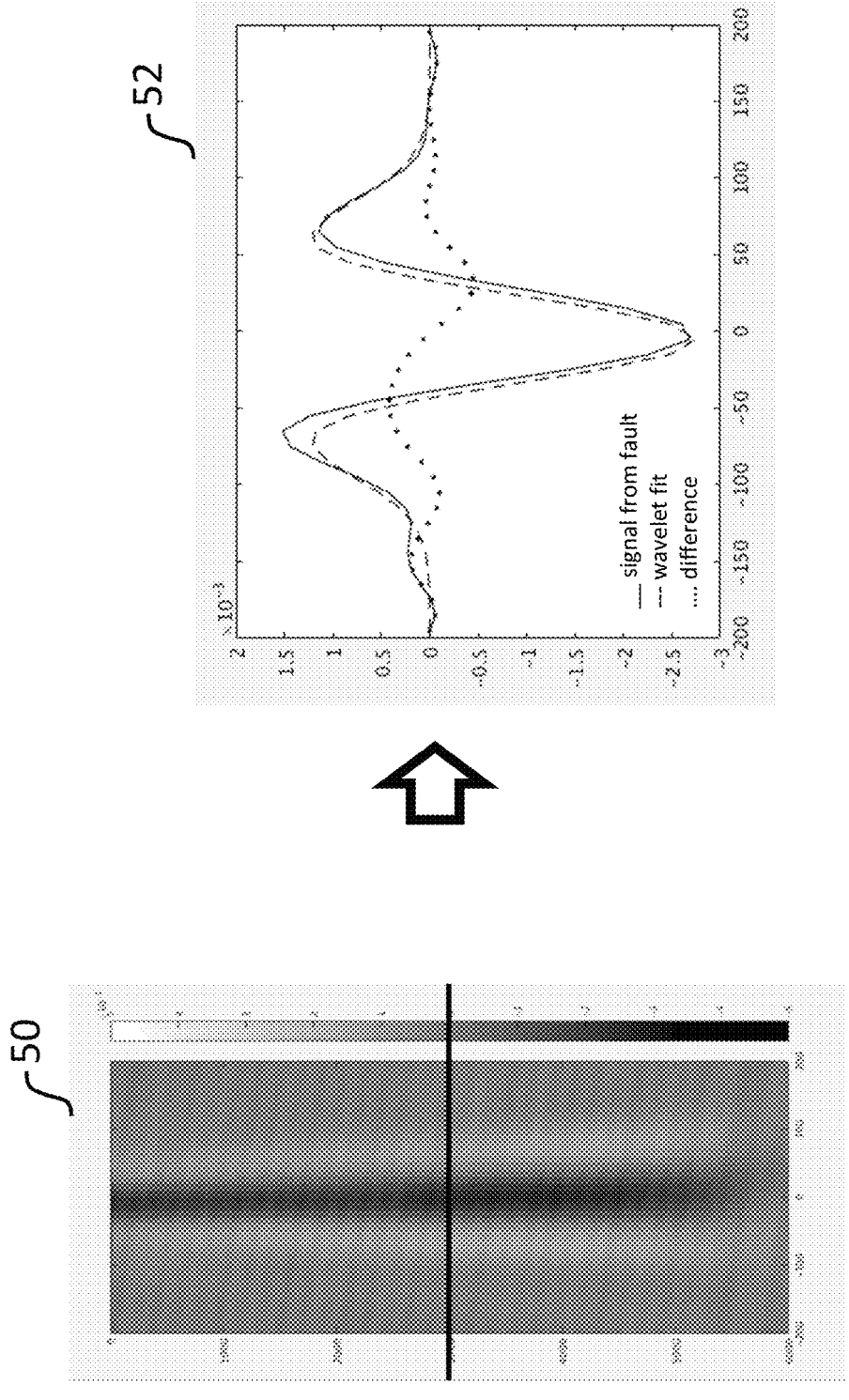
FIG. 5 demonstrates a step of a method of predicting fault seal from a seismic image, in accordance with some embodiments.

Method 100A continues on to operation 16, performing fault trace fitting. At this operation, the fault reflection traces are defined to be the traces normal (i.e. perpendicular) to the fault surface at all fault locations. For each fault reflection trace, a trace fitting process is applied to obtain a best-fit wavelet and corresponding characters (e.g. type of wavelet, amplitude, phase, frequency, shift, etc.) of that wavelet. The best-fit wavelet is the wavelet with highest trace-fitting quality among all the wavelets generated by grid-searching all possible characters of interest (e.g. type of wavelet, amplitude, phase, frequency, shift, etc.). As an example, the trace-fitting quality can be defined as the total energy of the fitting wavelet divided by the sum of the total energy of the fitting wavelet and the total energy of the residual trace, where the residual trace is the difference between the fault reflection trace and the fitting wavelet. FIG. 5 shows an example of the best-fit wavelet with comparison with the fault reflection signal. The extracted amplitudes in the fault coordinate system, which may or may not have been subjected to an enhancement process, is shown in panel 50. At each location along the fault (the vertical axis in panel 50), the trace across the fault is extracted and matched with a best-fit wavelet, as shown for one location in panel 52. The trace-fitting quality of the best-fit trace can be output with other information (e.g. type of wavelet, amplitude, phase, frequency, shift, etc.) and a threshold value or threshold function can be set to distinguish reliable fault seismic signal from noise.

Figure 6:
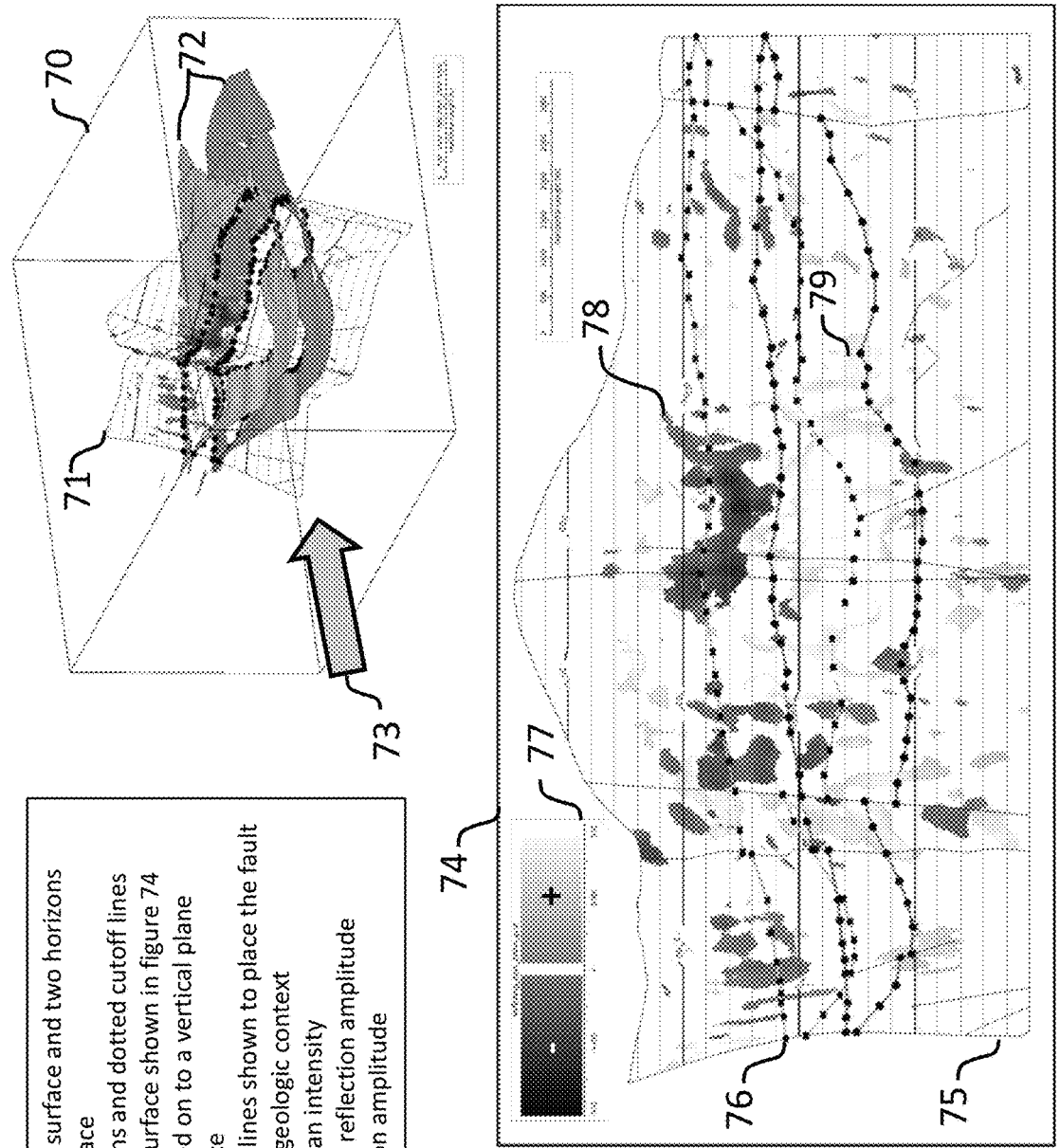
FIG. 6 is a diagram illustrating an application to a natural fault structure of a fault seal prediction system, in accordance with some embodiments.
Figure 7:
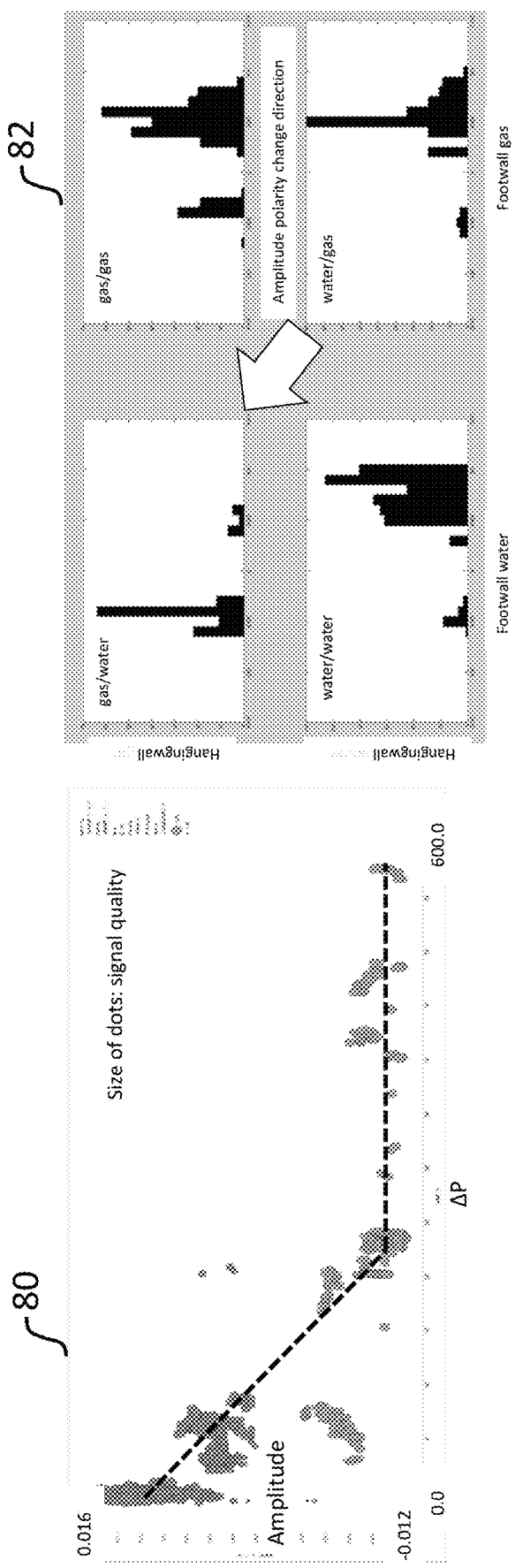
FIG. 7 is a cross plot of fault seismic signal amplitude vs measured cross-fault fluid pressure differences and histograms of fault seismic signal amplitude for four cases of cross-fault fluid juxtaposition, illustrating an application to a natural fault structure of a fault seal prediction system, in accordance with some embodiments.

Referring again to FIG. 1A, at operation 17 the method predicts the fault seal by comparing characters (e.g. type of wavelet, amplitude, phase, frequency, shift, etc.) of the matched wavelets with geological information (e.g. pore-fluid, lithology, porosity, pressure difference, etc. across the fault) at all the locations on the fault surface. FIG. 6 shows an example of fault amplitude (best-fit amplitude in operation 16) spatial distribution. FIG. 7 shows examples of amplitude correlation with geological information at all locations with such information. Panel 80 is an example of partial correlation of fault amplitude with pressure difference across the fault. Panel 82 is an example of amplitude histogram with four pore-fluid juxtaposition cases where the switch from hanging wall water with footwall gas to hanging wall gas with footwall water is reflected as amplitude shift from positive to negative. If correlations can be established where geological information (usually from wells) is present, fault seismic signal can be used to predict geological information where such information is not available or limited.

While certain specific features are illustrated, those skilled in the art will appreciate from the present disclosure that various other features have not been illustrated for the sake of brevity and so as not to obscure more pertinent aspects of the embodiments disclosed herein.

Optionally, the amplitude extraction in operation 14A of FIG. 1A could be achieved with variable interpolation techniques, including but not limited to nearest-values, trilinear interpolation and non-linear interpolation.

Optionally, the directions along which the amplitudes are extracted in operation 14A of FIG. 1A could be directions other than perpendicular to the fault surface.

Optionally, the geological information that the fault seismic signal is related to includes pore-fluid density, chemical-phase, and/or pressure across the fault.

Optionally, geological information that the fault seismic signal is related to includes rock type, porosity, density and/or any other physical rock properties across the fault.

Optionally, geological information that the fault seismic signal is related to includes fault zone thickness and properties within the fault zone.

Figure 2:
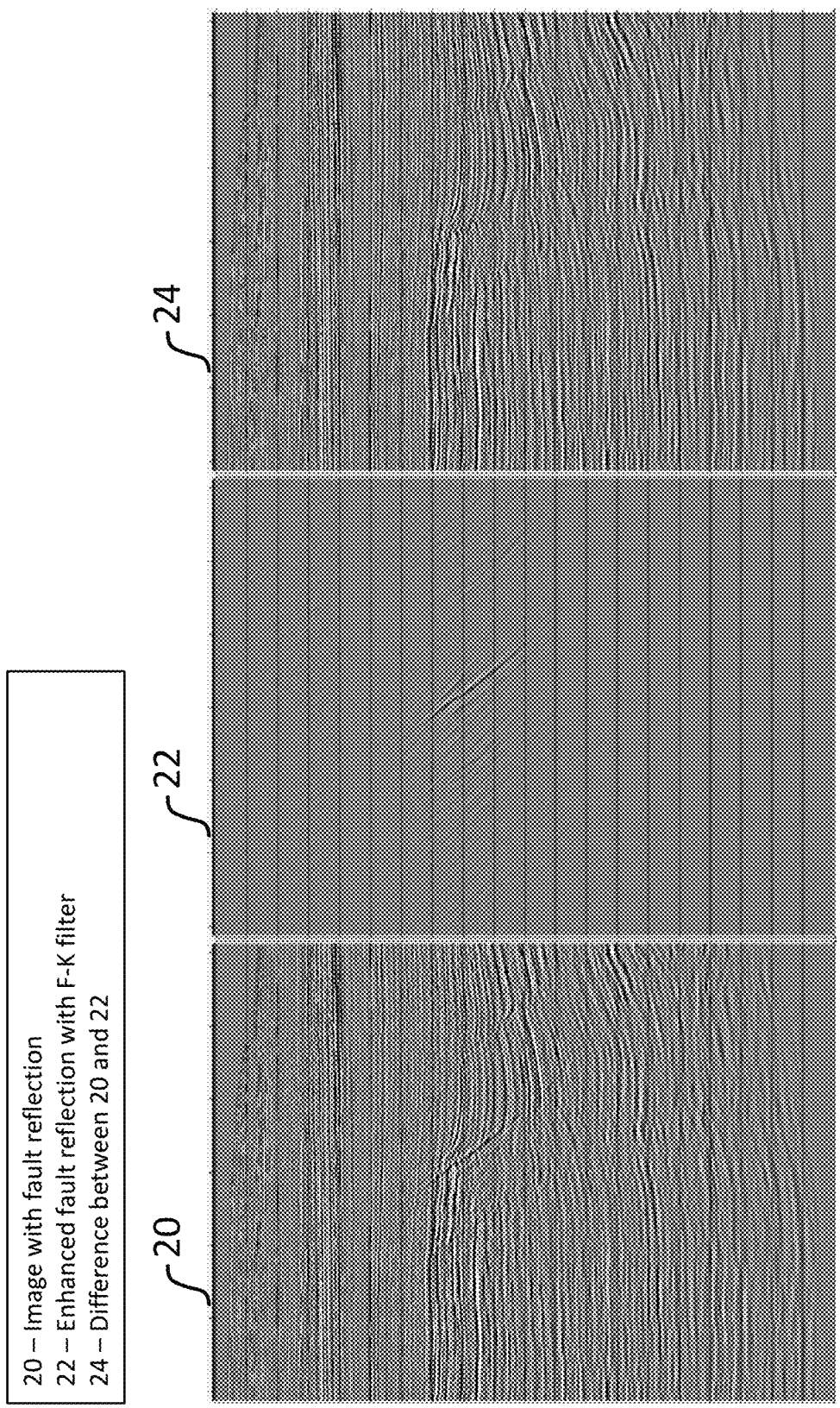
FIG. 2 demonstrates an optional step for enhancing the fault seismic signal along at least one fault surface, in accordance with some embodiments.

In another embodiment, the flowchart of a method 100A illustrated in FIG. 1A could apply to multiple partial images that are formed by partially stacking varying source-receiver offset range or subsurface angle, processing them separately and analyzing the results separately or in concert. The alternative flowchart is illustrated in FIG. 1B as method 100B. Method 100B is the same as method 100A with some changes to handle multiple digital seismic partial stack images. First, at operation 10B, the method 100B receives multiple digital seismic images that are most likely partial stacks of a pre-stack migrated seismic image. Partial stacks are formed by summing a range of adjacent offsets or angles (e.g., 5°-20°, 20°-40°, etc.). Each image received will have at least one common fault surface identified. For each image, method 100B may optionally enhance the fault reflection 11, as described for method 100A. At operation 12, a fault coordinate system is defined for each image, once again as described for method 100A. In one embodiment, the fault coordinate system may be the same for all of the images. At operation 14B, for each image the fault reflection amplitudes are extracted and placed into the fault coordinate system. The amplitudes in the fault coordinate system may optionally be enhanced at operation 15, as described with respect to method 100A. At this point, method 100B has multiple fault-coordinate-system images that appear like those seen in FIG. 4, panel 40 or, if operation 15 was executed, panel 42. Referring again to FIG. 1B, fault reflection trace fitting is performed for each of the images 16B. The trace fitting is done as explained for method 100A for each image, resulting in multiple fitted traces (wavelets). These wavelets are compared to a geological model or data to predict fault seal 17 and used to identify geological features based on the fault seal prediction 18, as described for method 100A. In this embodiment, since trace fitting is performed for multiple images (e.g., partial stack images), the differences in the fitted traces also provides information about the subsurface that can be leveraged in operation 17.

Figure 8A:
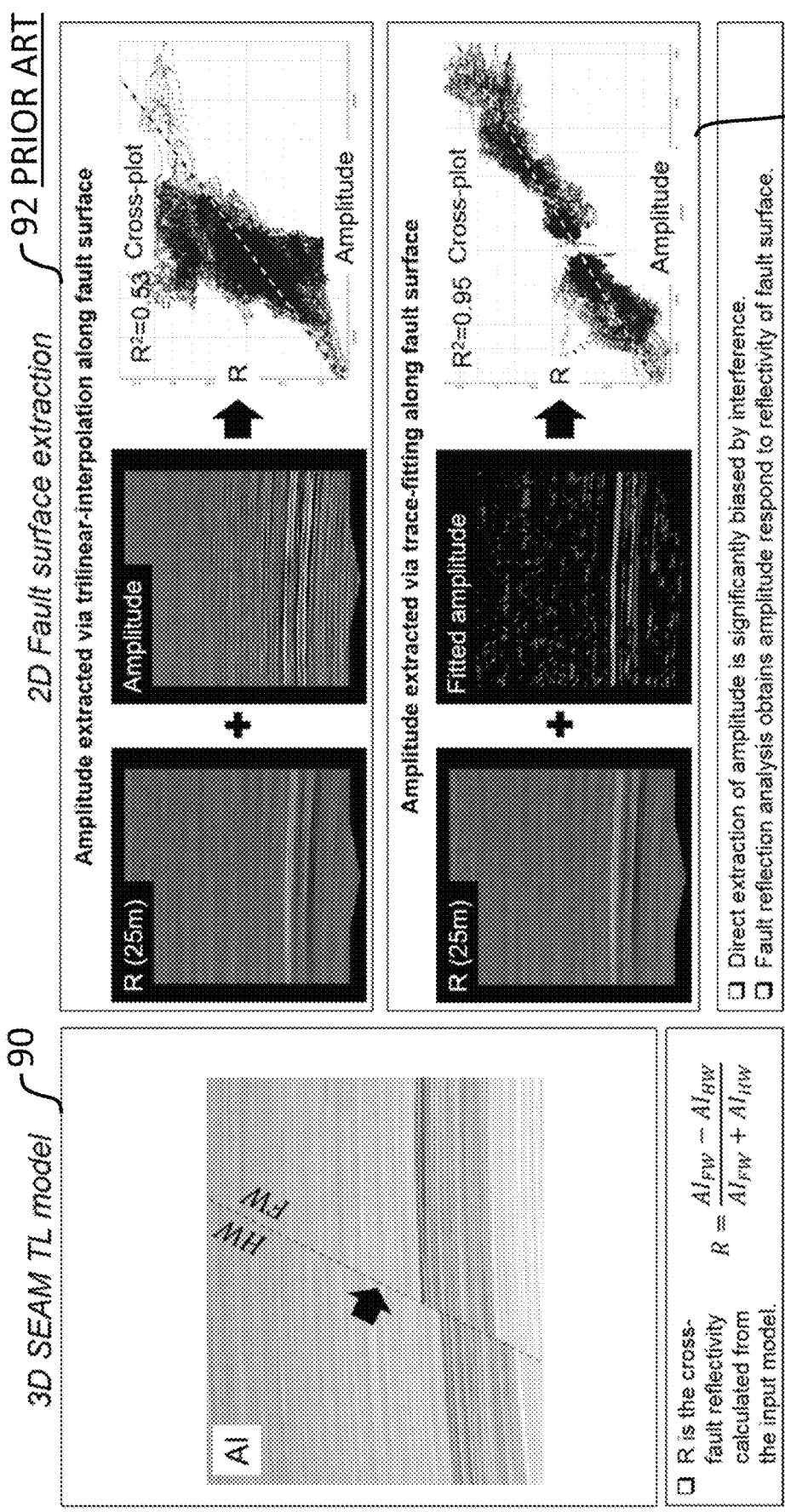
FIG. 8A, using an application to synthetic data, demonstrates the effectiveness of an embodiment of a method of predicting fault seal from a seismic image in which the extracted reflectivity is compared with and without trace fitting and fault seismic signal enhancement, in accordance with some embodiments.
Figure 8B:
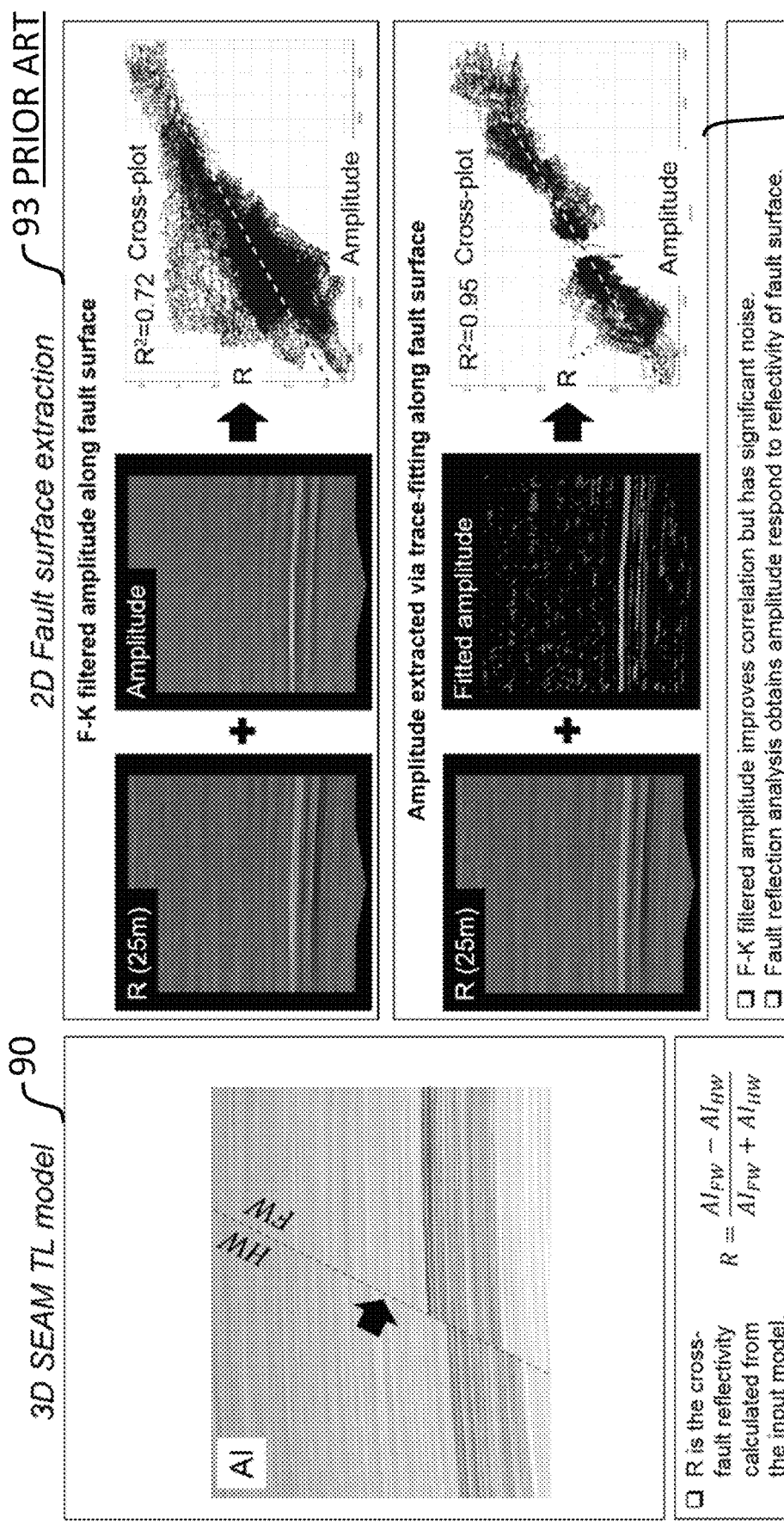
FIG. 8B, using an application to synthetic data, demonstrates the effectiveness of an embodiment of a method of predicting fault seal from a seismic image in which the extracted reflectivity is compared with and without trace fitting, in accordance with some embodiments.

To show the effectiveness of the method 100A, a synthetic case study was performed. The synthetic model and data was provided by SEG Advanced Modeling corporation (SEAM). In FIG. 8A, seismic image was obtained from seismic data and velocity model and fault surface was interpreted. Reflectivity on the fault surface was calculated from acoustic properties across the fault. Fault seismic amplitude was obtained using a prior art method, not method 100A, as shown in panel 92. Fault seismic amplitude was obtained with method 100A, panel 94. The cross-plot of fault seismic amplitude with reflectivity improves significantly after applying method 100A. FIG. 8B shows the specific improvement as a result of trace-fitting (operation 16A in FIG. 1A). Fault seismic amplitude was obtained with a prior art F-K filtering method, but without trace-fitting, panel 93. Fault seismic amplitude was obtained with method 100A, panel 94.

Figure 9:
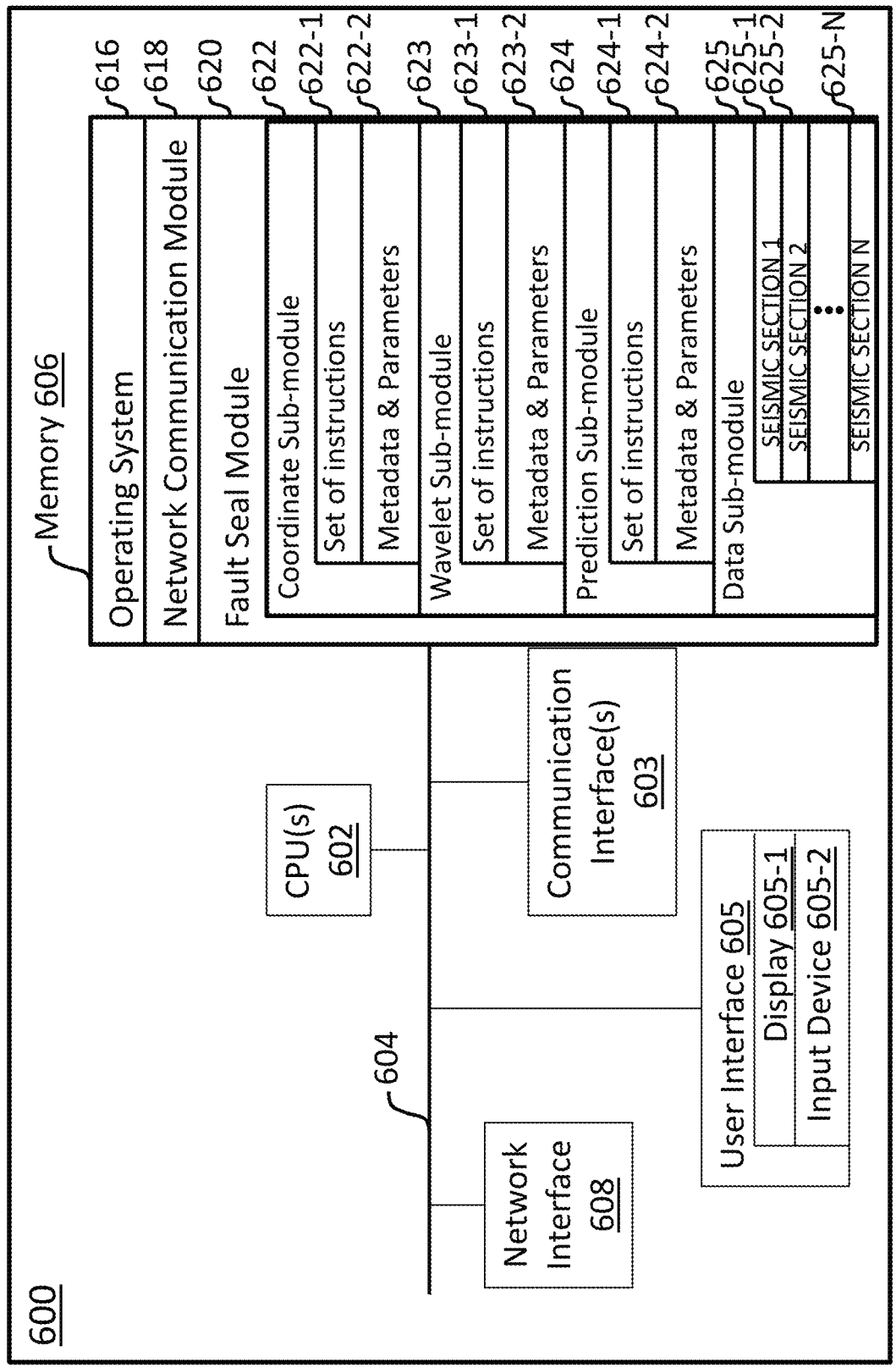
FIG. 9 is a block diagram illustrating a fault seal prediction system, in accordance with some embodiments.

FIG. 9 is a block diagram illustrating a fault seal prediction system 600, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the fault seal prediction system 600 includes one or more processing units (CPUs) 602, one or more network interfaces 608 and/or other communications interfaces 603, memory 606, and one or more communication buses 604 for interconnecting these and various other components. The fault seal prediction system 600 also includes a user interface 605 (e.g., a display 605-1 and an input device 605-2). The communication buses 604 may include circuitry (sometimes called a chipset) that interconnects and controls communications between system components. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPUs 602. Memory 606, including the non-volatile and volatile memory devices within memory 606, comprises a non-transitory computer readable storage medium and may store seismic data, velocity models, seismic images, and/or geologic structure information.

In some embodiments, memory 606 or the non-transitory computer readable storage medium of memory 606 stores the following programs, modules and data structures, or a subset thereof including an operating system 616, a network communication module 618, and a fault seal module 620.

The operating system 616 includes procedures for handling various basic system services and for performing hardware dependent tasks.

The network communication module 618 facilitates communication with other devices via the communication network interfaces 608 (wired or wireless) and one or more communication networks, such as the Internet, other wide area networks, local area networks, metropolitan area networks, and so on.

In some embodiments, the fault seal module 620 executes the operations of method 100A. Fault seal module 620 may include data sub-module 625, which handles the seismic dataset or image including seismic sections 625-1 through 625-N. This seismic data/image is supplied by data sub-module 625 to other sub-modules.

Coordinate sub-module 622 contains a set of instructions 622-1 and accepts metadata and parameters 622-2 that will enable it to execute operations 12 and 14A of method 100A. The wavelet sub-module 623 contains a set of instructions 623-1 and accepts metadata and parameters 623-2 that will enable it to execute operation 16A of method 100A. The prediction sub-module 624 contains a set of instructions 624-1 and accepts metadata and parameters 624-2 that will enable it to execute at least operation 18 of method 100A. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 605-1. In addition, any of the seismic data/images or processed seismic data products may be transmitted via the communication interface(s) 603 or the network interface 608 and may be stored in memory 606.

Method 100A is, optionally, governed by instructions that are stored in computer memory or a non-transitory computer readable storage medium (e.g., memory 606 in FIG. 9) and are executed by one or more processors (e.g., processors 602) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100A is described as being performed by a computer system, although in some embodiments, various operations of method 100A are distributed across separate computer systems.

Figure 10:
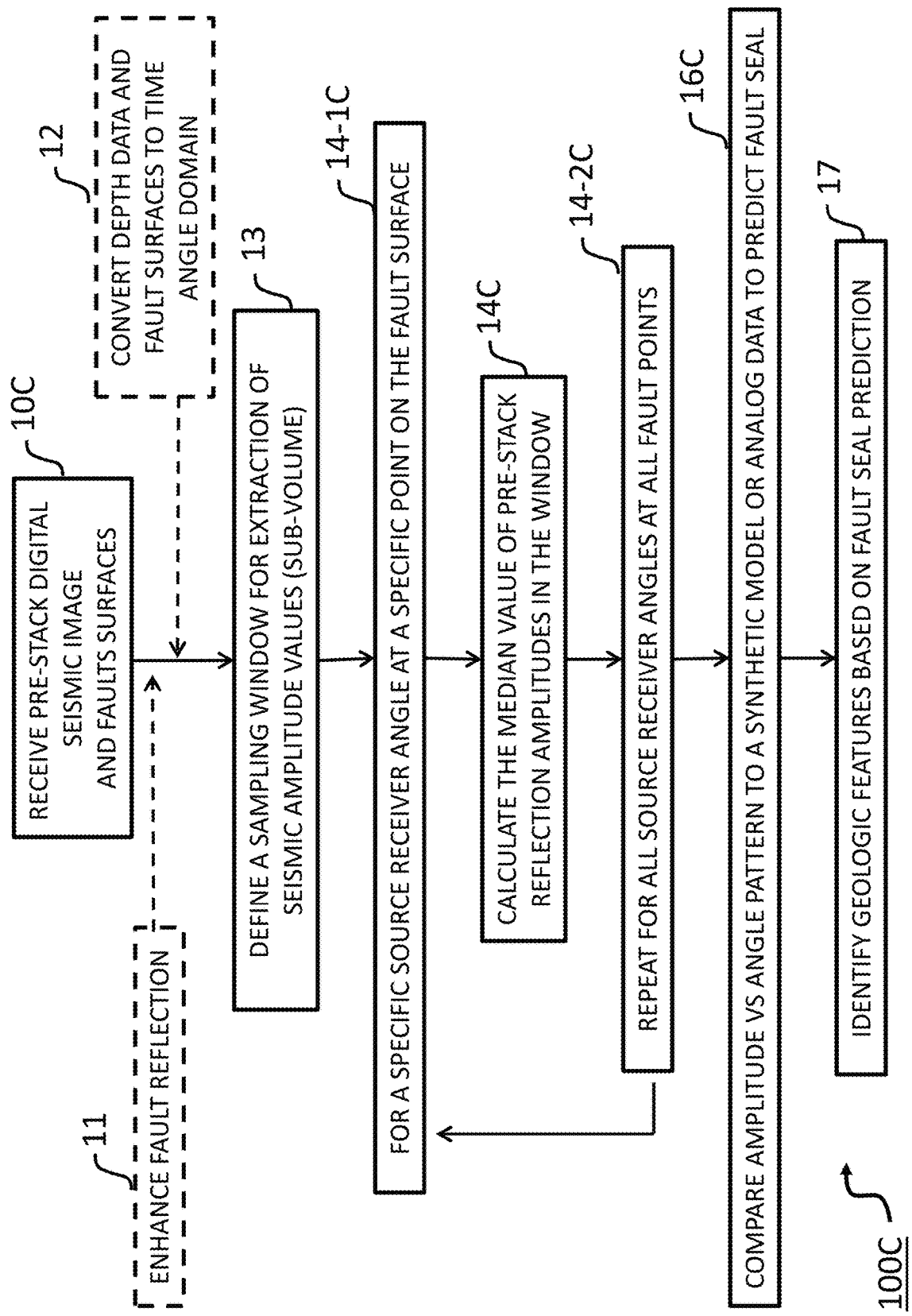
FIG. 10 illustrates a flowchart of a method of predicting fault seal from a pre-stack seismic image and a fault surface or surfaces, in accordance with some embodiments.

The methods illustrated by FIGS. 1A and 1B may be further modified to handle pre-stack seismic images. A workflow illustrating this embodiment is shown in FIG. 10 as method 100C. In method 100C, a pre-stack digital seismic image is received as well as at least one fault surface 10C. The pre-stack seismic image includes an offset or angle dimension. The pre-stack seismic image may optionally have the fault reflection enhanced 11, as explained, for example, in the description of method 100A. If the pre-stack seismic image and fault surface are in the depth domain, they can optionally be converted to the time-angle domain 12. For the pre-stack seismic image, it is necessary to define a sampling window to use for the extraction of seismic amplitude values 13. Method 100C now begins a loop to extract the fault amplitudes. This loop begins by selecting a specific source-receiver angle at a specific point on the fault surface 14-1C. Then for this specific source-receiver angle at a specific point on the fault surface, the method calculates the median value of the pre-stack reflection amplitudes 14C in the window defined at operation 13. The loop continues by selecting another source-receiver angle and/or point on the fault surface. This is repeated for all source-receiver angles at all points on the fault surface 14-2C. The extracted amplitudes for each angle allows comparison of the amplitude vs angle (AVA) pattern to a synthetic model or analog data (e.g., AVA data from another subsurface location that may be analogous to the subsurface of interest) to predict fault seal 16C. The method proceeds to identify geologic features based on the fault seal prediction 17.

People of skill in the art will appreciate that method 100C may optionally be performed in other domains, such as time offset, depth offset and depth angle domains. The process of extracting and analyzing the amplitudes is easily extended to these other domains.

Figure 11:
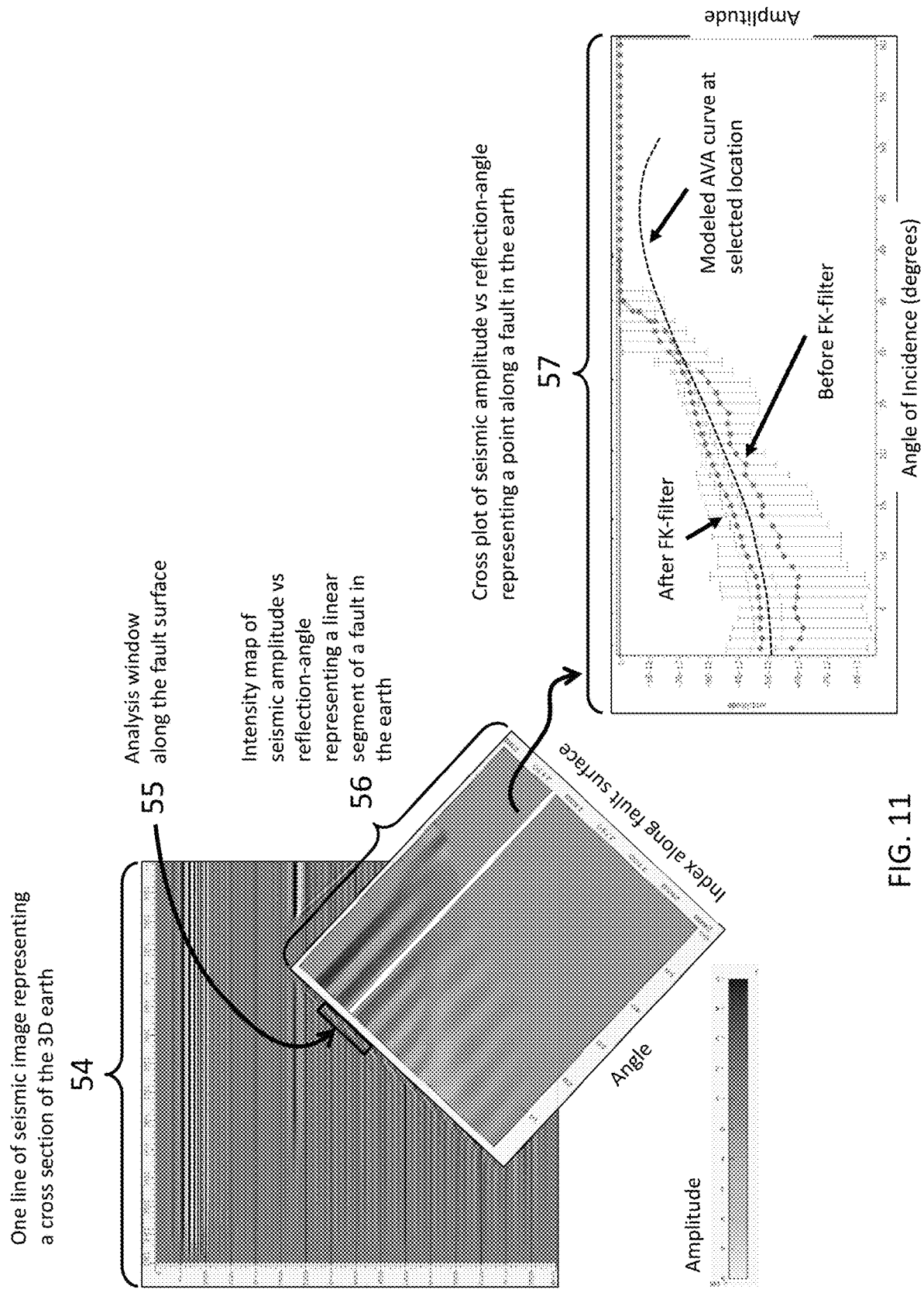
FIG. 11 demonstrates steps of a method of predicting fault seal from a pre-stack seismic image and a fault surface or surfaces, in accordance with some embodiments.

An example of method 100C is shown in FIG. 11. Panel 54 shows one line of a pre-stack seismic image that was received at operation 10C. The window defined at operation 13 is shown as box 55. The extracted amplitudes from operations 14C, 14-1C, and 14-2C are shown in panel 56. Panel 57 shows the comparison of the AVA patterns from operation 16C. The "Before FK-filter" and "After FK-filter" lines represent the AVA curves with and without the optional fault reflection enhancement 11. The modeled AVA curve is for a known subsurface and allows a decision about whether the subsurface represented by the pre-stack seismic image is comparable to the known subsurface that the modeled AVA curve was generated from.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of predicting fault seal, comprising:
    receiving, at a computer processor, a digital seismic image representative of a subsurface volume of interest including at least one fault surface, wherein the at least one fault surface is represented by a fault seismic signal in the digital seismic image;
    defining a fault coordinate system locally parallel and perpendicular to the at least one fault surface;
    extracting seismic amplitudes from a sub-volume surrounding and containing the at least one fault surface and mapping the seismic amplitudes in the fault coordinate system;
    performing trace fitting of the seismic amplitudes along directions locally perpendicular to the fault surface to separate the fault seismic signal from other seismic energy;
    comparing the fault seismic signal derived from trace fitting to at least one of natural analogs and synthetic models of seismic response to generate a predicted fault seal; and
    identifying geologic features based on the predicted fault seal.

2. The method of claim 1 further comprising selecting a drilling location based on the geologic features and drilling a well.

3. The method of claim 1 further comprising, before the defining the fault coordinate system, enhancing the fault seismic signal in the digital seismic image.

4. The method of claim 1 further comprising, before the performing trace fitting, enhancing the fault seismic signal in the fault coordinate system.

5. The method of claim 1 wherein the digital seismic image includes two or more digital seismic images representing sub-sets of available seismic data acquired for different ranges of source-receiver offsets or subsurface angles; for each of the two or more digital seismic images executing the defining the fault coordinate system, the extracting the seismic amplitudes, and the performing trace fitting to generate two or more sets of the fault seismic signal; and using the two or more sets of the fault seismic signal for the comparing to generate the predicted fault seal.

6. The method of claim 1 wherein the extracting seismic amplitudes is done using trilinear interpolation, non-linear interpolation, nearest-values, or other interpolation methods.

7. The method of claim 1 wherein the trace-fitting is performed with a threshold value or a threshold function to distinguish high quality signal from noise.

8. The method of claim 1 wherein the predicted fault seal is based on relating the fault seismic signal to differences in at least one of pore-fluid density, chemical-phase, and pressure across the fault surface.

9. The method of claim 1 wherein the predicted fault seal is based on relating the fault seismic signal to differences in fault zone thickness and properties within the fault zone.

10. The method of claim 1 wherein the predicted fault seal is based on relating the fault seismic signal to differences in at least one of rock type, porosity, density and any other physical rock properties across the fault surface.

11. A computer system, comprising:
one or more processors;
memory; and
one or more programs, wherein the one or more programs are stored in the memory and configured to be executed by the one or more processors, the one or more programs including instructions that when executed by the one or more processors cause the device to:
receive, at a computer processor, a digital seismic image representative of a subsurface volume of interest including at least one fault surface, wherein the at least one fault surface is represented by a fault seismic signal in the digital seismic image;
define a fault coordinate system locally parallel and perpendicular to the at least one fault surface;
extract seismic amplitudes from a sub-volume surrounding and containing the at least one fault surface and mapping the seismic amplitudes in the fault coordinate system;
perform trace fitting of the seismic amplitudes along directions locally perpendicular to the fault surface to separate the fault seismic signal from other seismic energy;
compare the fault seismic signal derived from trace fitting to at least one of natural analogs and synthetic models of seismic response to generate a predicted fault seal; and
identify geologic features based on the predicted fault seal.

12. A non-transitory computer readable storage medium storing one or more programs, the one or more programs comprising instructions, which when executed by an electronic device with one or more processors and memory, cause the device to
receive, at a computer processor, a digital seismic image representative of a subsurface volume of interest including at least one fault surface, wherein the at least one fault surface is represented by a fault seismic signal in the digital seismic image;
define a fault coordinate system locally parallel and perpendicular to the at least one fault surface;
extract seismic amplitudes from a sub-volume surrounding and containing the at least one fault surface and mapping the seismic amplitudes in the fault coordinate system;
perform trace fitting of the seismic amplitudes along directions locally perpendicular to the fault surface to separate the fault seismic signal from other seismic energy;
compare the fault seismic signal derived from trace fitting to at least one of natural analogs and synthetic models of seismic response to generate a predicted fault seal; and
identify geologic features based on the predicted fault seal.

* * * * *